Figure 1:
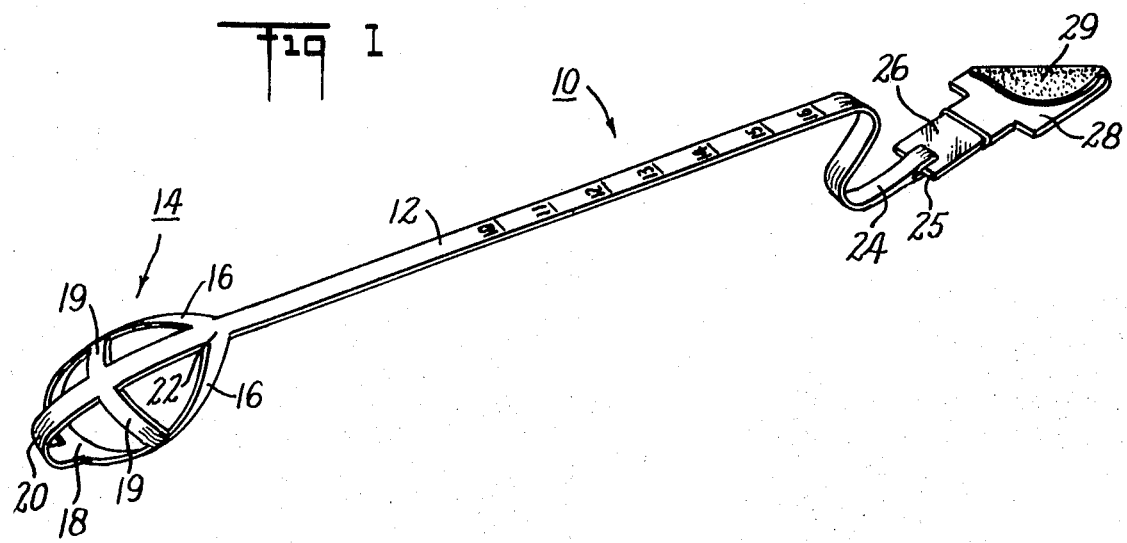

United States Patent
Cuadros

[15] 3,643,651
[45] Feb. 22, 1972

[54] FINGER SCALE FOR GYNECOLOGIC AND OTHER MEASUREMENT OF BODY ORIFICE

[72] Inventor: Alvaro J. Cuadros, Hartsdale, N.Y.
[73] Assignee: Lorton Laboratories, Ltd., New York, N.Y.
[22] Filed: Aug. 4, 1970
[21] Appl. No.: 60,815

[52] U.S. Cl. ............................. 128/2 S, 33/137 R, 33/174 D
[51] Int. Cl. .................................................. H61l 5/00
[58] Field of Search .................... 128/2 R, 2 S, 3 CL; 33/205, 33/174 D, 137 R, 137 L, 172 E, 197

[56] References Cited

UNITED STATES PATENTS

| | | | |
|---|---|---|---|
| 2,241,451 | 5/1941 | Fist | 128/2 S |
| 3,097,637 | 7/1963 | Horton | 128/2 S |
| 2,686,366 | 8/1954 | Berkovic | 33/137 R |

Primary Examiner—William E. Kamm
Attorney—Curtis, Morris & Safford

[57] ABSTRACT

A diagnostic instrument for taking gynecologic and other pelvic measurements is adapted to be worn on the hand and includes a narrow measuring strip of flexible inextensible material having a finger stirrup at one end thereof which is adapted to retain a fingertip inserted therein, such that the strip extends along the finger from the fingertip to a band of elastic material which in turn is fixed to an adhesive strip for securing the instrument to the hand. The band of elastic material intervening between the measuring strip and the adhesive strip allows the instrument to conform to the hand when the fingers are flexed or extended. The narrow strip is calibrated in units of length from a zero point at the tip of the stirrup so that gynecologic and pelvic measurements may be taken upon insertion of the finger into a body orifice such as the vagina.

9 Claims, 2 Drawing Figures

PATENTED FEB 22 1972 3,643,651

INVENTOR.
Alvaro J. Cuadros
BY
Curtis, Morris + Safford
ATTORNEYS

FINGER SCALE FOR GYNECOLOGIC AND OTHER MEASUREMENT OF BODY ORIFICE

This invention relates generally to measuring instruments and more particularly to instruments of the type which may be used to take gynecologic and pelvic measurements.

Gynecologic and pelvic measurements have been taken in the past by a number of various methods. One such method is the mere manual insertion of the physician's index and/or middle fingers within the vagina to measure, for example, vaginal depth, the location of the cervix, true conjugate diameter of the pelvis, etc. In this method, the physician locates the tip of the inserted finger against the object whose location is to be measured and the other end of the finger against some reference point, as for example the pubis, and then places a finger of his other hand against his inserted finger at its point of contact with the pubis to mark that point so that when the fingers are withdrawn, the distance between the fingertip and the marked point may be measured by an assistant utilizing a pair of external calipers.

Other proposed methods utilize metallic instruments, such as calipers with extensible legs, which are inserted within the vagina to measure distances between various parts of the body adjacent thereto. Such instruments, however, have relatively hard surfaces and may easily damage body organs or the mucous tissues over bones which they are pressed against, and thus have been generally found unsatisfactory for use. Moreover, such instruments are difficult for the physician to carry with him and they must be sterilized before each use.

Yet another known method of taking gynecologic measurements involves the use of a rubber glove having an indexed finger sheath thereon. The glove is worn by the doctor when inserting his fingers for taking measurements. Such gloves eliminate the need for an assistant, but are relatively expensive. Moreover, being formed of an elastic material, they are subject to severe distortion if the physician's fingers are bent when taking the desired measurements. These gloves have been found to be generally unsatisfactory in use since measurements taken therewith are inaccurate.

Accordingly, it is an object of the present invention to take gynecologic and pelvic measurements simply and directly with a disposable measuring instrument. Another object of the invention is to provide a gynecologic measuring instrument which is simple in construction and inexpensive to manufacture.

In accordance with an aspect of this invention, a diagnostic instrument which is adapted to be worn on the hand of a physician when taking gynecologic and pelvic measurements is provided which includes a narrow measuring strip of flexible inextensible material having a stirrup fixed to one end thereof. The stirrup is adapted to receive and retain the tip of a finger inserted therein. The narrow strip may conveniently be formed of an inexpensive plastic such as "Mylar," and extends back from the stirrup along the finger. The measuring strip is fixed at its opposed end to a band of elastic material which in turn is fixed to a strip of adhesive material which secures the strip to the physician's hand. The band of elastic material intervening between the measuring strip and the adhesive strip allows the instrument to conform to the hand when the fingers are flexed or extended. The measuring strip is calibrated from a zero point at the tip in units of length, so that with the strip thus secured to his hand, the physician may insert his finger into a bodily orifice such as the vagina, to measure the size of, and the distance between, various bones, internal organs, etc. Such measurements, for example, may include the depth of the vagina, the location of the cervix, the true conjugate diameter of the pelvis, and such other relatively linear measurements which diagnostic procedures require. Further, the device is useful in other medical areas for taking internal body measurements, as for example in proctology and pathologic examinations.

Figure 2:
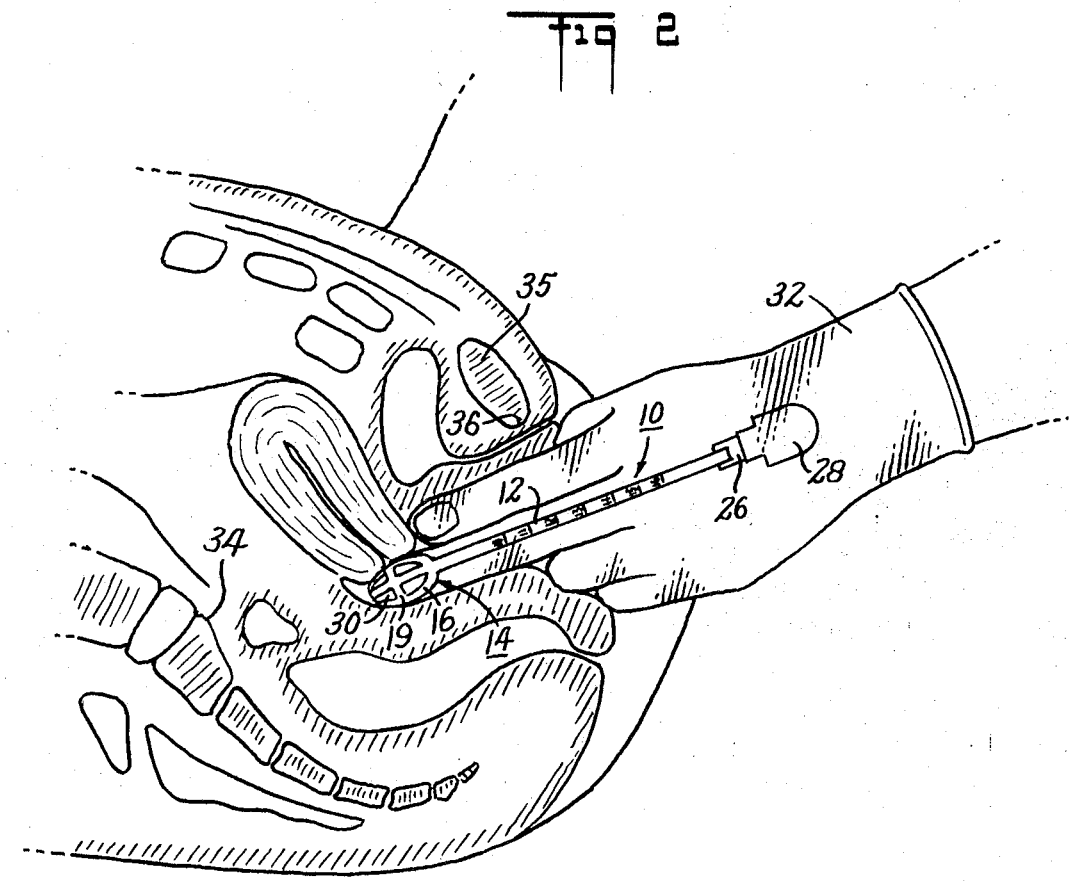

The above, and other objects, features and advantages of this invention, will be apparent from the following detailed description of an illustrative embodiment of the invention which is to be read in connection with the accompanying drawings wherein:

FIG. 1 is a perspective view of a diagnostic instrument of a type in which the present invention may be employed; and FIG. 2 is a partially schematic sectional view showing the instrument in use.

Referring now to the drawings in detail, and initially to FIG. 1 thereof, it will be seen that a diagnostic instrument 10 of the type in which the present invention may be employed generally comprises an elongated strip 12 of flexible and inextensible material, such as of plastic, having a stirrup configuration 14 integrally formed at one end thereof which is adapted to receive the physician's finger.

Stirrup 14 is formed by a pair of strips of material 16, also suitably of plastic and conveniently integral with strip 12, which extend angularly from either side thereof and are joined at a central point 18 to form a generally oval enclosure which extends generally along the sides of the fingertip. A third strip 20, extends from the point of juncture 22 between strips 12 and 16 to the point 18, and forms an end portion of the stirrup which is adapted to engage the tip of the finger and restrain instrument 10 thereon. As seen in FIG. 1, yet another pair of strips 19 may be provided between strips 16 and strip 20, to surround the fingertip and restrain lateral movement thereof out of stirrup 14.

Strip 12 extends rearwardly from point of juncture 22 and is calibrated, as seen in FIG. 1, in graduations of conventional units of length, as for example, centimeters or inches. The zero point of the calibrations or scale, is located at the tip of strip 20, so that the zero point is located at the point of contact of the tip of the physician's finger when it is against the object from which distance is to be measured.

The rearward end 24 of strip 12 is attached in any conventional manner to one end 25 of a band 26 of elastic material. The other end 27 of band 26 is secured to a strip 28 which has an adhesive lower surface 29 adapted to secure the rearward end of the strip 12 against the physician's hand. The adhesive is conveniently a pressure-sensitive adhesive like that used on surgical adhesive tape, for example. The elastic band 26 intervening between strip 12 and adhesive strip 28 allows the instrument to conform to the hand when the fingers are flexed or extended, yet the inextensibility of strip 12 assures accurate measurements.

Referring now to FIG. 2, the diagnostic instrument 10 is illustrated in position upon a physician's finger, while the finger is inserted within the vagina to measure the depth thereof from a position adjacent the cervix. As seen in FIG. 2, stirrup 14 surrounds the tip 30 of the physician's finger, and strip 12 extends rearwardly therefrom to strip 26 which is adhered to the back of the physician's hand. The physician thus locates the object to be measured or the object from which distance is to be measured with the tip of his finger, and engages the posterior portion of his finger against a reference surface, e.g., pubis 35. The physician marks the point of contact with the reference surface visually or by placing a second finger on that point and obtains a direct reading from the calibrations on strip 12 either immediately or upon withdrawal of the hand from the vagina.

To discourage the possibility of strip 12 sliding laterally off the finger, the physician may place a transparent glove 32 over his hand and the instrument 10 after the latter is placed in position on the hand. The strip 28 and glove 32 thereafter act as a unit to maintain the position of instrument 10.

While it is contemplated that the instrument of the present invention be disposable, so that a separate instrument could be inexpensively utilized for the examination of each individual patient, it is noted that when glove 32 is used, the instrument remains out of contact with the patient and may be conveniently carried with the physician, for example, during his hospital rounds, to examine a number of patients.

While the instrument is illustrated in FIG. 2, as taking a single measurement, that is the depth of the vagina, it is clear that the instrument can be used for taking a number of various measurements, as for example, the true conjugate diameter of the pelvis. This measurement is the distance from the promontory 34 of the sacrum to the surface 36 of the pubic bone 35 and is accomplished by merely inserting the finger and hand to a depth at which it is in contact with these bones. The flesh and organs surrounding these parts are deformed by the insertion of the hand to provide the space required for taking these measurements. In addition, the physician may use conventional obstetrical equipment to maintain the vagina in an expanded state to accommodate his hand.

Further, the exact location of tumors or other growths and restrictions located within the body may be determined with the above described instrument. By utilizing the calibrated diagnostic instrument of the present invention, the unwanted growth or stricture may be located by taking measurements from the growth or stricture to a number of points adjacent the opening to the body so that the exact location thereof is defined in preparation for surgical procedures if necessary.

Since the diagnostic instrument 10 is formed of an inextensible material, the measurements taken thereby are accurate, and there are no errors due to deformation or stretching of the material. Moreover, the physician is able to measure curved surfaces or arcuate lengths since the instrument is flexible and will conform to the finger as it is bent to conform with the curvature being measured. Elastic band 26 in this case accommodates variations in the effective finger length on bending, and thus assures accurate measurements with strip 12. Thus, the instrument of the present invention provides a greater flexibility than the mechanical measuring instruments previously proposed. Accordingly, it is seen that a lightweight disposable diagnostic instrument is provided which permits the physician to take gynecological and pelvic measurements as desired.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A diagnostic instrument adapted to be worn on the hand for taking gynecologic and other measurements of bodily orifices, said instrument comprising, a strip of flexible relatively inextensible material, a stirrup fixed to one end of said strip and adapted to receive the tip of a finger inserted therein, said strip being adapted to extend from said fingertip along said finger and having calibrations thereon, the zero point of said calibrations being substantially at the tip of said stirrup, and means for securing said strip to said hand whereby gynecologic, pelvic and other measurements may be taken upon insertion of said finger into a bodily orifice such as the vagina.

2. An instrument as in claim 1 wherein said material is plastic.

3. An instrument as in claim 2 wherein said means comprises an adhesive body secured to the other end of said strip.

4. An instrument as in claim 3 including an elastic band connected intermediate said strip and said adhesive body to accommodate flexing of said finger.

5. A diagnostic instrument adapted to be worn on the hand for taking gynecologic and other measurements of bodily orifices, said instrument comprising a strip of flexible relatively inextensible material having first and second end portions, said first end portion having a finger stirrup integrally formed therewith, and said second end portion having means fixed thereto for securing said strip to said hand.

6. An instrument as in claim 5 wherein said strip is plastic.

7. An instrument as in claim 6 wherein said strip is calibrated and the zero point of said calibrations is located at the tip of said stirrup.

8. An instrument as in claim 7 wherein said means comprises an adhesive body.

9. An instrument as in claim 8 including an elastic band connected intermediate said strip and said adhesive body to accommodate flexing of said finger.

* * * * *